M. O. CROSS.
GEAR INDEXING MECHANISM.
APPLICATION FILED APR. 5, 1918.

1,426,552.

Patented Aug. 22, 1922.

Witness

Inventor
MILTON O. CROSS

By Charles E. Wiener
Attorney

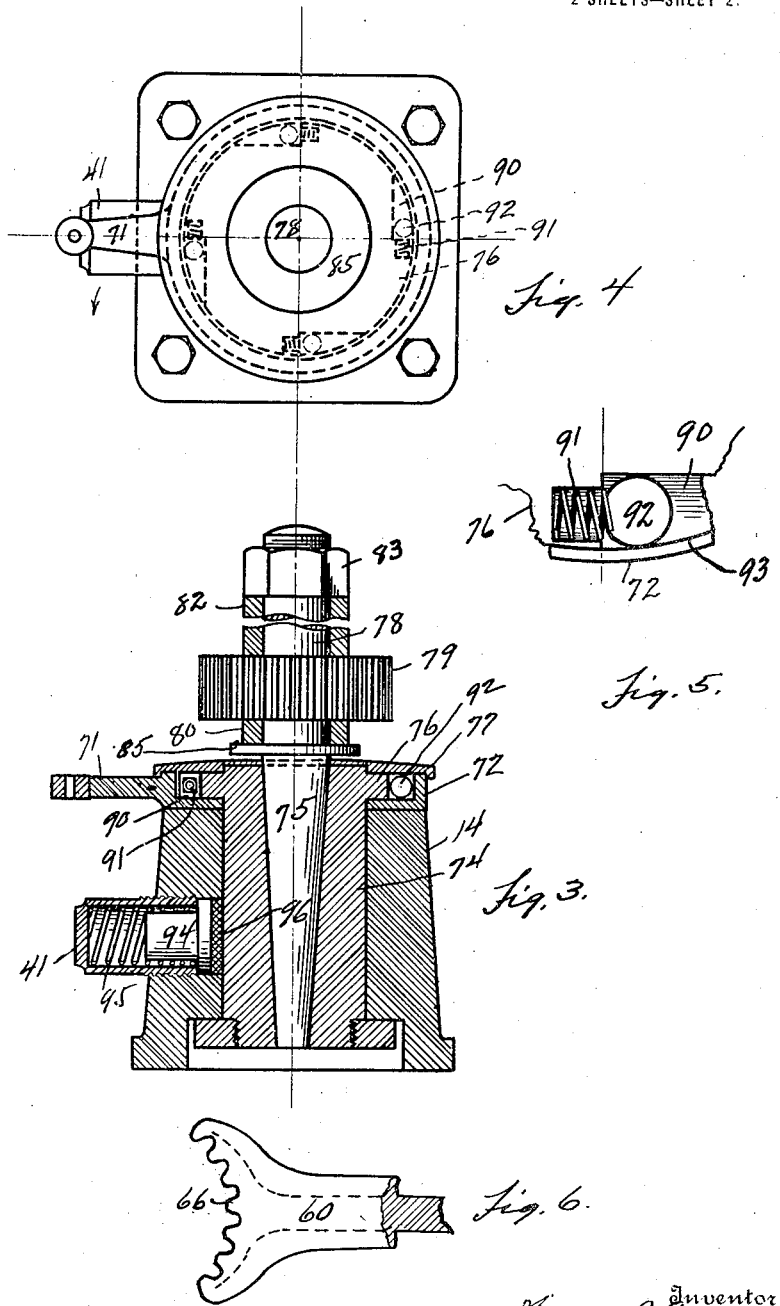

UNITED STATES PATENT OFFICE.

MILTON O. CROSS, OF DETROIT, MICHIGAN.

GEAR-INDEXING MECHANISM.

1,426,552.  Specification of Letters Patent.  Patented Aug. 22, 1922.

Application filed April 5, 1918. Serial No. 226,829.

*To all whom it may concern:*

Be it known that I, MILTON O. CROSS, a citizen of the United States, residing at Detroit, county of Wayne, State of Michigan, have invented a certain new and useful Improvement in Gear-Indexing Mechanism, and declare the following to be a full, clear, and exact description of the same, such as will enable others skilled in the art to which it pertains to make and use the same, reference being had to the accompanying drawings, which form a part of this specification.

This invention relates to gear indexing mechanism adapted for use with tooth rounding machines such as is disclosed in my U. S. Patent No. 1,279,278 issued Sept. 17, 1918, and the purpose of this invention is to provide an indexing mechanism that is adapted for universal use with gears of any desired number of teeth. In said previous application the device for indexing the gear to present successive teeth for operation by the cutter embodies a pawl and ratchet device. With such pawl and ratchet, the device is unadapted to accurately index gears having a number of teeth not a multiple or divisor of the number of teeth of the ratchet as will be readily understood by those familiar with indexing mechanism. This invention seeks to obviate such difficulty and to provide an indexing device that may be used with gears with any number of teeth and to accurately index the same. These and the several novel features of the invention are hereinafter more fully described and claimed and shown in the accompanying drawings in which—

Fig. 3 is a vertical section of the indexing mechanism.

Fig. 4 is a plan view thereof.

Fig. 5 is a detail of the clutch utilized to rotate the gear.

Fig. 6 is a plan view of a sector used to rectify error in indexing.

Figure 2:
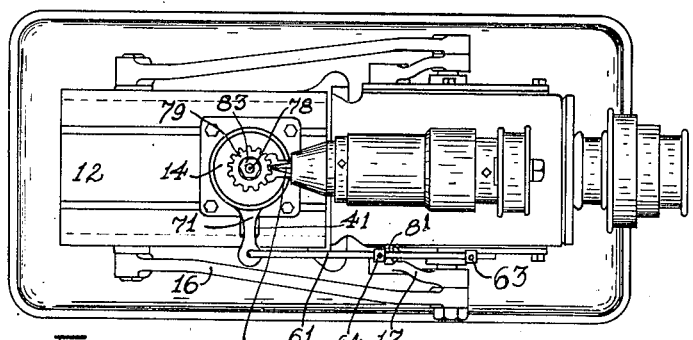
Fig. 2 is a plan view thereof.
Figure 1:
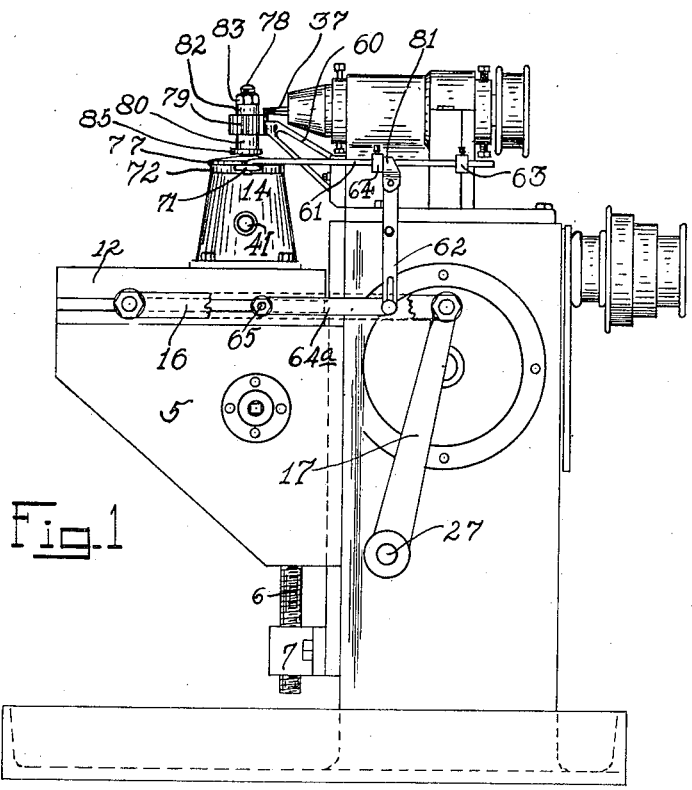
Fig. 1 is a side elevation of a tooth rounding machine showing my improved indexing mechanism in conjunction therewith.

The operation of the tooth rounding machine is fully described in the said pending application, the only feature thereof herein requiring mention is the sector 60 attached to the forward part of the machine above the table 12. This sector has an internal toothed face 66, the teeth being complemental to those of the gear to be cut, and this face engages the gear beneath the cutting tool 37 as shown in Fig. 1, being a sufficient distance beneath the cutter to allow the same to operate after the manner described in said pending application. The sector is shown in plan in Fig. 6, and this sector is stationarily positioned on the machine frame 1 and the gear is carried by the head 14 which is movable backward and forward with the table 12. The table 12 slides on ways provided therefor and is moved by means of a bar 16 and lever 17 operated by means of a shaft 27, the operation of which shaft is described in the said pending application. Movement of the table 12 carries with it the bar 64ª pivoted at 65 to the table, which bar is pivotally connected with the slotted end of the pivoted lever 62 mounted on the machine. This lever is provided with a forked end 81 and in the said fork rides the rod 61 connected with the indexing device. This rod 61 has two collars 63 and 64 spaced apart thereon adapted to be engaged by the forked end on movement of the table, one collar being engaged on the outward movement of the table and the other being engaged on the inward movement of the table. These collars are adjustably carried on the rod so that an adjustment may be had to vary the extent of rotation of the gear by the rod 61.

By use of a movable stop a quick action of the clutch member is secured just at the completion of movement of the table in either direction. As the stop 81 is moving in a direction the reverse of that of either of the stops when engaging therewith the rod 61 is not only caused to cease movement but is actually moved in a direction opposite to that of the table and clutch. The release of binding of the clutch therefore is accomplished in a much shorter period than would be possible with a fixed stop. By varying the point of pivoting of the lever 62, the movement of the rod 61 may be greater than the distance the clutch and gear holder is moved to the table.

This rod 61 engages an arm 71 formed integrally with a ring member 72 which is rotatably mounted on the upper end of the head 14 and is centrally apertured to receive the arbor 74 for the spindle 75 which carries the gear. This arbor 74 has a flange 76 at the upper end lying within an annular recess in the ring member 72 and retains the ring in place on the head. A cap member 77 is carried by the arbor and engages over the ring member 72 as shown in Fig. 3. The arbor is provided with a central conical aperture in which the coned spindle 75 fits and the upper end of the spindle is provided with a cylindrical part 78 adapted to receive the gear 79 as shown. To position the gear longitudinally of the portion 78, a sleeve 80 is utilized beneath the gear resting on a flange 85 of the spindle and a second sleeve 82 is provided on the upper side of the gear and the end of the portion 78 is threaded to receive a nut 83 for binding the gear in place on the spindle. By use of the sleeves the gear is positioned vertically as may be desired. Adjustment of the vertical position of the gear may also be secured by vertically adjusting the height of the table 12 and supporting element 5 therefor by rotation of the screw 6 which is in threaded relation with a boss 7 attached to the base 1 of the machine as shown in Fig. 1.

This flange member 76 of the arbor is provided with a plurality of marginal notches 90 preferably four in number as shown in Fig. 4 and the bottom of the notch is recessed to receive a spring 91. A ball 92 is positioned in the recess and is of a diameter to quite closely fit in the notch 90 between the wall thereof and inner face 93 of the ring member 72. The spring forces the ball into engagement with the wall of the notch and inner face of the ring.

It is to be noted that the inner wall of the notch 90 is at a right angle to a radial line passing through the center of the spindle 75 as will be understood from Fig. 4, or is parallel with a tangent to the inner circular face 93 of the ring and when assembled with the ring a recess is provided for the ball that is of a size at one end to just free the ball from the face 93 of the ring by rotative movement of the ring in one direction. On rotative movement of the ring in the opposite direction, however, the ball will tend to roll toward the point of the recess formed by the wall of the notch and the face of the ring which binds the ring to the arbor 74. It will, therefore, be seen that outward movement of the head 14 and engagement of the end 81 with the collar 63 at the end of the rod will draw the arm 71 toward the machine. On an inward movement of the arm 71 in the direction of the arrow shown in Fig. 4, the ball will tend to roll forward in the recess provided therefor and bind the ring to the arbor and turn the gear to the extent determined by the travel of the table and time of engagement of the collar 63 with the end 81 of the lever 62. This indexes the gear and on completion of the inward movement of the table to bring the gear to operative relation with the cutter 37, the collar 64 will engage the end 81 of the lever and turn the ring 72 in reverse direction, in which direction of movement the ring will turn without turning the arbor.

It is thus to be seen that, by each backward and forward movement of the table carrying the gear, the gear is turned to an extent determined by the setting of the collars 63 and 64 on the rod 61. It is evident, however, that an absolutely exact indexing cannot be secured by this arrangement alone. Inasmuch as there is a possible slight movement of the ring relative the arbor before the ball 92 is firmly engaged between the ring and arbor and also, inasmuch as it is not possible to manually set the collars 63 and 64 sufficiently to avoid discrepancy of such character, it is necessary to provide means for correcting possible error in the indexing device. The final positioning of the gear is therefore determined by the sector 60 which, as before stated, is provided with teeth complemental to the teeth of the gear, and the sector teeth are depended upon to set the gear to exact position for operation thereon by the cutter. This may be accomplished by reason of the very close setting of the gear to position by the indexing mechanism described and as the gear is brought into engagement with the sector 60 any slight discrepancy in position of the gear is corrected by engagement of the gear teeth with the teeth of the sector which has an accurately cut face for this purpose.

To prevent an overthrow of the arbor 74 by reason of the sudden engagement of the end 81 of the lever with either collar, a plug 41 is provided in the head 14 having a bearing member 94 and a spring 95 pressing the same against the side of the cylindrical arbor. A friction plate 96 is interposed between the end of the plug and the arbor so that the arbor is thus frictionally held from accidental rotation or overthrow. The problem solved by the described mechanism is peculiar. The gear to be operated upon by the mechanism shown is a previously cut or formed gear in which formation the blank has been indexed and, as both the indexing mechanism and the cutting mechanism has some inaccuracies in it caused by wearing of parts etc., the finished gear after being placed in a second similar indexing mechanism will not be indexed strictly in accord with the first indexing. In the gear tooth rounding machine which is the subject of my former Patent No. 1,279,278, a previously cut or formed gear is to be operated upon, the teeth having been formed by an indexing mechanism. In placing the gear in this tooth rounding machine of my former patent therefor, this gear must be indexed strictly in accord with the first indexing during which it was cut or formed, and the method by which such second indexing may be accurately performed is by utilizing a sector having teeth cut to conform to the character of the teeth of the gear to be operated and positioned relative to the tooth rounding cutter in such manner that a tooth of the gear when brought into mesh with the sector is accurately positioned relative to the tool. This is accomplished by turning the gear when out of engagement with the sector and tool to approximately its indexed position as nearly as the indexing device may position it and, subsequent to freeing it from the indexing mechanism, bringing it into mesh with the sector which sets the tooth accurately relative to the tool.

From the foregoing description it is believed evident that the indexing device of which the sector or guide 61 forms an important part, is adaptable for use with gears of any number of teeth. It is further evident that the guide or sector 61 may be utilized with various indexing mechanisms as for instance the mechanism described in my U. S. Patent No. 1,279,278 of September 17, 1918, to correct the inaccuracies in indexing a previously cut gear.

What I claim is—

1. A gear indexing mechanism comprising in combination with a cutter for operating on the tooth of a gear and a holder for the gear movable toward and from the cutter, of an arbor rotatably mounted in the holder, frictional means yieldably holding the arbor from rotation, a rotatable clutch adapted to bindingly engage the arbor and turn the same when turned in one direction and to release from engagement therewith on turning in the opposite direction, means adapted to actuate the clutch on movement of the head in either direction, a gear carried by the arbor and rotatable therewith, and a sector having teeth complemental to the gear teeth engaged by the gear when brought to position for operation by the cutter.

2. A gear indexing mechanism comprising in combination with a cutter for operating on the tooth of a gear and a holder for the gear movable toward and from the cutter, of an arbor rotatably mounted on the holder, a rotatable ball clutch device adapted to bindingly engage the arbor upon rotation in one direction and to turn freely in relation thereto on rotation in the other direction, means for turning the clutch alternately in each direction, the device for actuating the clutch being adapted to be adjusted to give approximately the correct rotation of the arbor for indexing the gear, and a stationary guide engaging the gear teeth to rectify inaccuracy of indexing by the clutch.

3. A gear indexing mechanism comprising in combination with a cutter for operating on the tooth of a gear and a holder movable toward and from the cutter to bring the gear into and out of operative relation therewith, of an arbor for the gear rotatably supported by the holder, a clutch adapted to bindingly engage the arbor on rotative movement in one direction and to disengage from the arbor on movement in the other direction, means adapted to bind the clutch on the arbor on movement of the holder from the cutter and for freeing the clutch from engagement with the arbor on movement of the gear toward the cutter, said means being adapted to approximately index the gear, and a sector having teeth complemental to the teeth of the gear engaged by the gear on movement to operative position adapted to rectify inaccuracy of indexing by the clutch.

4. A gear indexing mechanism consisting of a rotatably mounted clutch member adapted to bind on the gear support on rotation in one direction and to release therefrom on rotation in the other direction, said means being adapted to approximately index the gear, and means for rectifying the inaccuracy of indexing by the clutch on the completion of indexing movement thereof.

5. In combination with a cutter for operating on a gear tooth and a holder for the gear movable toward and from the cutter, means for indexing the same during movement of the holder, and a guide engaged by the gear teeth when brought to operative relation with the cutter to rectify error of the indexing mechanism.

6. The combination with a cutter for operating on a gear tooth and a holder for the gear movable toward and from the cutter, of means for indexing the gear during movement of the holder, and a guide consisting of a sector having teeth complemental to those of the gear engaged thereby on movement of the gear to operative relation with the cutter whereby previous to the operation inaccuracy of the indexing mechanism is rectified by the sector.

7. A gear indexing mechanism comprising in combination with a cutter for operating on a gear tooth and a holder movable to and fro to bring the gear into and out of operative relation with the cutter, an arbor rotatably mounted in the holder having a circular flanged end, a clutch member consisting of a ring like portion positioned about the circumference of the said flange, the flange having marginal notches, each having a wall at an angle to the face of the inclosing ring, a ball in each of the recesses, a spring for forcing the ball toward the narrow portion of the recess, a lever connected with the ring, means connected with the lever whereby on movement of the holder from the cutter the ring is turned about the arbor and the ball members bindingly engage the flange and ring and turn the holder and are released therefrom on movement in the opposite direction, said mechanism being adjustable whereby the gear is approximately accurately indexed during movement of the holder, yieldable means for restraining the holder from rotation to prevent an overthrow thereof by the clutch, and a guide member engaged by the gear on being brought to operative relation with the cutter to rectify inaccuracy of indexing by the clutch.

8. In mechanism for indexing a gear, a holder for the gear, releasable means for turning the gear to approximately index the same, a member having a part complemental to the teeth of the gear, and means for causing engagement of the gear and member when the gear is released from the turning means to rectify error in the indexing operation.

9. In indexing mechanism, a gear holder, indexing means for approximately indexing the gear, a reciprocable table on which the holder is mounted, a member fixedly positioned and having a part complemental to the teeth of the gear engaged by the gear on completion of movement of the table, and means for releasing the gear from the indexing mechanism previous to its engagement with the complementally toothed member.

10. Means for indexing a gear having finished teeth for subsequent operation on the ends of the teeth comprising a holder for the gear, a cutter for operating on the ends of the teeth, means for turning the gear to approximately index the same previous to the cutting operation, means for moving the gear to position for the cutting operation, and a member having a part complemental to the gear teeth engaged thereby on movement to cutting position whereby the final position of the gear is determined by the teeth previous to the said operation thereon.

In testimony whereof, I sign this specification.

MILTON O. CROSS.